(12) United States Patent
Lu et al.

(10) Patent No.: US 11,786,842 B2
(45) Date of Patent: Oct. 17, 2023

(54) HYBRID LIGAND AND LIQUID CHROMATOGRAPHY STATIONARY PHASE INCLUDING HYBRID LIGAND

(71) Applicant: RESTEK CORPORATION, Bellefonte, PA (US)

(72) Inventors: Xiaoning Lu, State College, PA (US); Charles Vernon Bartlett, Snow Shoe, PA (US); Connor Flannery, State College, PA (US); Ahren Iver Green, Lock Haven, PA (US); Terrence Scott Reid, Bellefonte, PA (US)

(73) Assignee: RESTEK CORPORATION, Bellefonte, PA (US)

( * ) Notice: Subject to any disclaimer, the term of this patent is extended or adjusted under 35 U.S.C. 154(b) by 527 days.

(21) Appl. No.: 16/871,657

(22) Filed: May 11, 2020

(65) Prior Publication Data

US 2020/0376411 A1    Dec. 3, 2020

Related U.S. Application Data

(60) Provisional application No. 62/854,473, filed on May 30, 2019.

(51) Int. Cl.
*B01D 15/20* (2006.01)
*B01D 15/30* (2006.01)
(Continued)

(52) U.S. Cl.
CPC ......... *B01D 15/3847* (2013.01); *B01D 15/20* (2013.01); *B01D 15/305* (2013.01);
(Continued)

(58) Field of Classification Search
CPC .. B01D 15/3847; B01D 15/20; B01D 15/305; B01D 15/363; B01J 20/261;
(Continued)

(56) References Cited

U.S. PATENT DOCUMENTS 4,591,652 A    5/1986 Depasquale et al.
4,594,652 A    6/1986 Mattson
(Continued)

FOREIGN PATENT DOCUMENTS

CA    2005856 A1    6/1990
DE    4133719 A1    4/1993
(Continued)

OTHER PUBLICATIONS

Q. Chin. Wang et al: "Hydrophilization of Porous Polystyrene-Based Continuous Rod Column", Analytical Chemistry, vol. 67, No. 3, Feb. 1, 1995 (Feb. 1, 1995), pp. 670-674, XP055714939.
(Continued)

*Primary Examiner* — Benjamin L Lebron
(74) *Attorney, Agent, or Firm* — McNees Wallace & Nurick LLC

(57) ABSTRACT

A composition includes a hybrid ligand. The hybrid ligand includes an amine group, an amide group or a sulfonamide group, and hydroxyl groups. A first method includes providing a solution containing a first polar analyte and a second polar analyte, applying the solution to a stationary phase including an immobilized hybrid ligand, applying an elution solvent to the stationary phase such that the first polar analyte and the second polar analyte pass through the stationary phase with different elution times, and collecting the first polar analyte at a first elution time and collecting the second polar analyte at a second elution time after the first elution time. A device of a packed column, a cartridge, a tube, a well plate, a membrane, or a planar thin-layer chromatography plate includes a solid support and a hybrid ligand coupled to the solid support. A second method forms an immobilized hybrid ligand.

21 Claims, 10 Drawing Sheets

(51) Int. Cl.
*B01D 15/36* (2006.01)
*B01D 15/38* (2006.01)
*C07F 7/21* (2006.01)
*G01N 30/02* (2006.01)
*B01J 20/26* (2006.01)
*B01J 20/288* (2006.01)
*G01N 30/72* (2006.01)

(52) U.S. Cl.
CPC .......... *B01D 15/363* (2013.01); *B01J 20/261* (2013.01); *B01J 20/288* (2013.01); *C07F 7/21* (2013.01); *G01N 30/02* (2013.01); *G01N 30/7233* (2013.01); *G01N 2030/027* (2013.01)

(58) Field of Classification Search
CPC .......... B01J 20/288; C07F 7/21; G01N 30/02; G01N 30/7233; G01N 2030/027
See application file for complete search history.

(56) References Cited

U.S. PATENT DOCUMENTS

| | | | |
|---|---|---|---|
| 7,557,232 B2* | 7/2009 | Liu | .................... B01J 20/3285 556/463 |
| 9,259,710 B2 | 2/2016 | Rempfer et al. | |
| 9,925,521 B2 | 3/2018 | Wyndham et al. | |
| 10,265,679 B2 | 4/2019 | Wyndham et al. | |
| 2003/0187133 A1 | 10/2003 | Bernard | |
| 2004/0026660 A1 | 2/2004 | Vaughan-Spickers et al. | |
| 2013/0118986 A1 | 5/2013 | Diallo et al. | |
| 2015/0246814 A1 | 9/2015 | Li et al. | |
| 2015/0322183 A1 | 11/2015 | Vallat et al. | |
| 2016/0319480 A1 | 11/2016 | Katzenmeier et al. | |
| 2018/0259494 A1 | 9/2018 | Shah et al. | |

FOREIGN PATENT DOCUMENTS

| | | |
|---|---|---|
| EP | 0625524 A2 | 11/1994 |
| KR | 20130078749 | 7/2013 |
| WO | 0212366 A1 | 2/2002 |
| WO | 0240614 A1 | 5/2002 |
| WO | 2014090756 A1 | 6/2014 |
| WO | 2015091740 A2 | 6/2015 |

OTHER PUBLICATIONS

Svec F et al: "Molded Rigid Monolithic Porous Polymers: An Inexpensive, Efficient, and Versatile Alternative To Beads for the Design of Material for Numerous Applications", Industrial & Engineering Chemistry Research, American Chemical Society, vol. 38, No. 1, Jan. 1, 1999 (Jan. 1, 1999), pp. 34-38, XP000788228.

* cited by examiner

HYBRID LIGAND AND LIQUID CHROMATOGRAPHY STATIONARY PHASE INCLUDING HYBRID LIGAND

RELATED APPLICATIONS

This application claims the benefit of, and priority to, U.S. App. No. 62/854,473 filed May 30, 2019, which is hereby incorporated by reference in its entirety.

FIELD

The present disclosure is generally directed to ligands. More specifically, the present disclosure is directed to hybrid ligands including an amine group, an amide or sulfonamide group, and a portion with multiple hydroxyl groups, methods for the creation and immobilization of ligands onto solid supports, liquid chromatography stationary phases including an immobilized hybrid ligand, and applications of an immobilized ligand in a chromatography stationary phase for the separation of a wide range of polar analytes.

BACKGROUND

Polar analytes typically show minimal or no retention on a reversed-phase column, such as a C18 column. Other types of stationary phases have been developed to solve this retention issue. In particular, hydrophilic interaction chromatography (HILIC) has gained popularity. Conventional HILIC stationary phases include bare silica and ligands containing diol groups, multiple hydroxyl groups, amide groups, or zwitterionic groups, among other groups. However, difficulties with method development and method robustness have been challenges to the adoption of HILIC. On the other hand, polar analytes may have various physicochemical properties based on the presence of cationic groups (e.g., protonated basic amines), anionic groups (e.g., ionized carboxylic or sulfonic acids), neutral groups, and/or groups with mixed properties. These properties may make polar analytes difficult to separate chromatographically with a single stationary phase or chromatography column.

Examples of difficult-to-separate polar analytes include amino acids; polar acidic herbicides such as glyphosate, aminomethylphosphonic acid, and glufosinate; neutral glycosylated compounds; water-soluble vitamins; organic acids; carbohydrates; peptides; and nucleosides and nucleotides.

SUMMARY

In an embodiment, a composition includes a hybrid ligand. The hybrid ligand includes an amine group, an amide group or a sulfonamide group, and a plurality of hydroxyl groups.

In another embodiment, a method of separating polar analytes includes providing a solution containing a first polar analyte and a second polar analyte. The method also includes applying the solution to a stationary phase including an immobilized hybrid ligand. The immobilized hybrid ligand includes an amine group, an amide group or a sulfonamide group, and a plurality of hydroxyl groups. The method further includes applying an elution solvent to the stationary phase such that the first polar analyte and the second polar analyte pass through the stationary phase with different elution times. The method also includes collecting the first polar analyte leaving the stationary phase at a first elution time and collecting the second polar analyte leaving the stationary phase at a second elution time after the first elution time.

In another embodiment, a device includes a chromatographic material including a solid support and a hybrid ligand coupled to the solid support as the stationary phase. The hybrid ligand includes an amine group, an amide group or a sulfonamide group, and a plurality of hydroxyl groups. The hybrid ligand is of the formula —R—$(CH_2)_x$—$N(R_1)$$(R_2)$—$(CH_2)_y$—NH—$R_3$—$(CHOH)_z$—$R_4$, where R represents a functional group attached to the solid support; x, y, and z independently are integers in the range of 2 to 10; $R_1$ and $R_2$ are independently H, a C1-C4 alkyl group, or an aryl group; $R_3$ is C(O) or S(O)(O); and $R_4$ is H, $CH_3$, or COOH. The device may be a packed column, a cartridge, a tube, a well plate, a membrane, or a planar thin-layer chromatography plate.

In yet another embodiment, a method of forming an immobilized hybrid ligand includes providing a linking molecule. The linking molecule includes a first end including a solid support coupling end group; a second end opposite the first end, the second end including a primary amine end group or a secondary amine end group; and an amine group on a backbone of the linking molecule between the solid support coupling end group and the primary amine end group or the secondary amine end group. The method also includes covalently coupling the linking molecule at the first end to a solid support by way of the solid support coupling end group. The method further includes covalently coupling the linking molecule at the second end to a terminal molecule by a terminal bond selected from the group consisting of an amide bond and a sulfonamide bond. The terminal molecule includes a plurality of hydroxyl groups.

Other features and advantages of the present invention will be apparent from the following more detailed description, taken in conjunction with the accompanying drawings which illustrate, by way of example, the principles of the invention.

DETAILED DESCRIPTION

Figure 1:
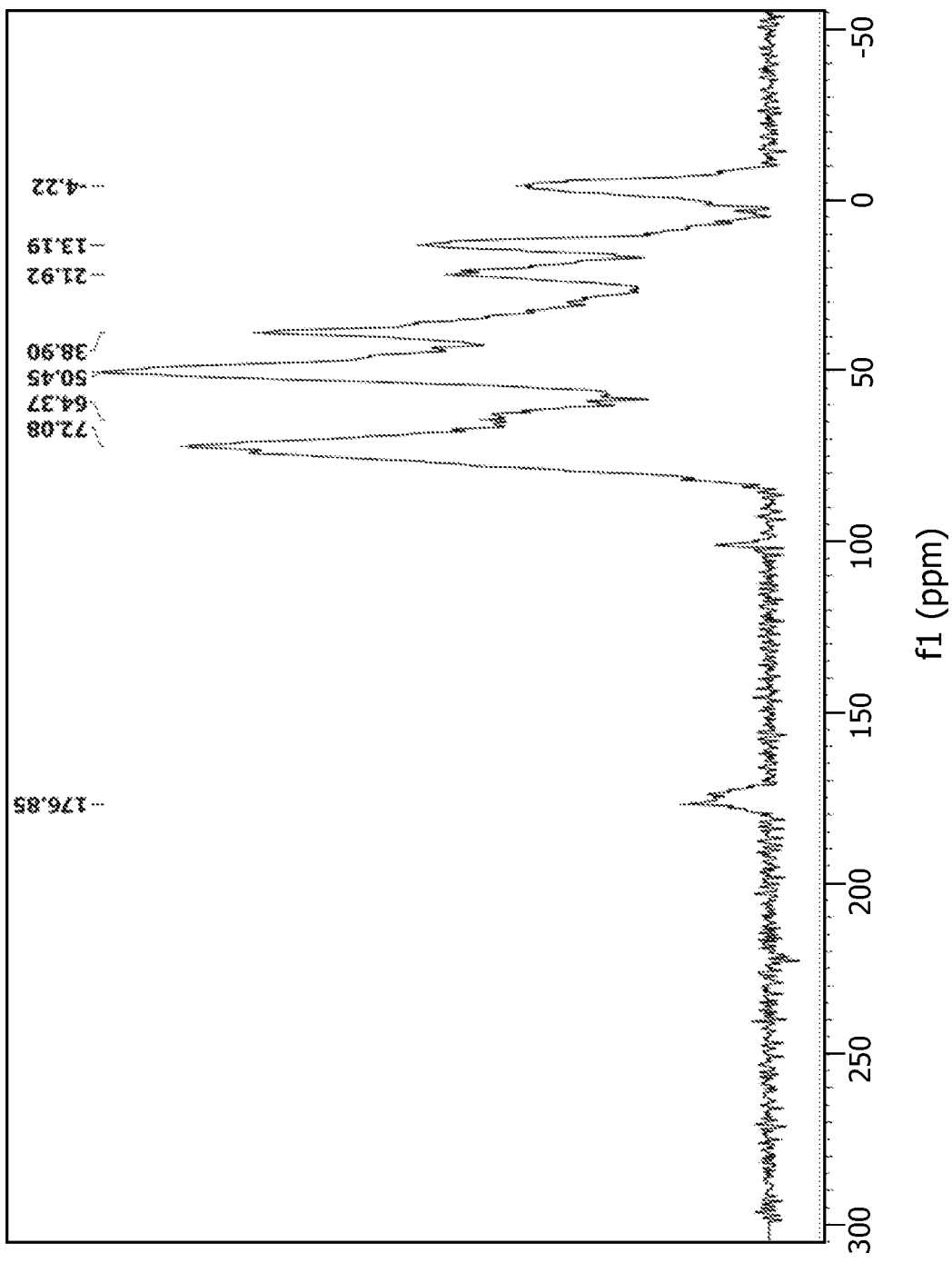
FIG. 1 shows a solid-state $^{13}C$ nuclear magnetic resonance spectrum of an immobilized hybrid ligand of the present disclosure.

A hybrid ligand immobilized on a solid support forms a stationary phase. The hybrid ligand has multiple functional groups and, when immobilized on a solid support, offers multimodal chromatographic retention and separation mechanisms including anion exchange chromatography (AEX), hydrophilic interaction chromatography (HILIC), and the combination of AEX and HILIC. The hybrid AEX-HILIC HPLC column is capable of separating and eluting a variety of polar compounds.

In some embodiments, a hybrid stationary phase includes ligands with multiple functional groups immobilized on solid supports and used as a stationary phase for the column liquid chromatography separation of polar analytes. The functional groups of the stationary phase include an anion exchange moiety, such as, for example, a secondary, tertiary, or quaternary amine, an amide or sulfonamide, and multiple hydroxyl groups. The hybrid stationary phase offers multiple separation mechanisms, including, but not limited to, anion-exchange interactions, hydrophilic interaction chromatography, and a blend or combination of these two modes. Appropriate solid support materials may include, but are not limited to, spherical silica, inorganic/organic hybrid silica particles, polymeric particles, 3D-printed silica or polymer support, and silica-based monolith or polymer-based monolith. In some embodiments, the modified solid supports including the hybrid stationary phases are packed into column formats and are applicable for the liquid chromatographic separation of a variety of polar analytes, including, but not limited to, acidic herbicides, organic acids, amino acids, water-soluble vitamins, sugars, nucleosides, nucleotides, drug metabolites, and peptides.

The chemical structure of the hybrid ligand is preferably selected to permit chromatographic separation of multiple polar analytes having at least one common polar functional group by hybrid AEX, HILIC, and/or a combination of AEX and HILIC. In some embodiments, the hybrid ligand includes an amine, an amide or a sulfonamide, and multiple hydroxyl groups.

In exemplary embodiments, the amine nitrogen and the amide nitrogen and carbon or the sulfonamide nitrogen and sulfur are part of the backbone of the ligand. The amine serves as an ion exchange moiety. The hydroxyl groups are preferably pendant groups extending directly off backbone carbons of the ligand. In exemplary embodiments, the amine nitrogen is closest to the solid support, the amide or sulfonamide group is intermediate, and the hydroxyl groups are farthest from the solid support, although other orderings may be employed as well. In exemplary embodiments, the hybrid ligand contains no other functional groups besides the amine, the amide or sulfonamide, the hydroxyl groups, and the functional group coupling the hybrid ligand to the solid support.

In some embodiments, the hybrid ligand has the following formula:

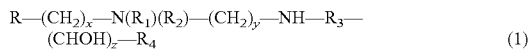

$$R-(CH_2)_x-N(R_1)(R_2)-(CH_2)_y-NH-R_3-(CHOH)_z-R_4 \quad (1)$$

where R represents a functional group capable of attaching to a solid support or the functional group attached to a solid support; x, y, and z independently are integers in the range of 2 to 10, such as, for example, 2 to 4, 2 to 6, 2 to 8, 3 to 6, 3 to 8, 3 to 10, 4 to 6, 4 to 8, 4 to 10, 2, 3, 4, 5, 6, 7, 8, 9, or 10; $R_1$ and $R_2$ are independently H, a C1, C2, C3, or C4 alkyl group, an aryl group, or an unbonded electron pair; $R_3$ is C(O) or S(O)(O); and $R_4$ is H, $CH_3$, or COOH. In some embodiments, one or more of x, y, z, $R_1$, $R_2$, and $R_3$ are selected to customize the hybrid ligand for increased separation of specific analytes.

In some embodiments, one or more of x, y, z, $R_1$, and $R_2$ are selected to decrease or reduce the hydrophobicity of the hybrid ligand. In some such embodiments, x and y independently are integers in the range of 2 to 3. In some such embodiments, $R_1$ and $R_2$ are independently H or $CH_3$.

In some embodiments, the solid support is silica. In some embodiments, the ligand is linked to the silica surface through a silanol group. In some embodiments, the functional group capable of attaching to the silica, represented by R in Formula (1) above, has the following formula:

$$R_5-O-Si(R_6)(R_7)- \quad (2)$$

where $R_5$ is a methyl group or an ethyl group and $R_6$ and $R_7$ are independently a C1-C4 alkyl group or an alkoxy group.

In exemplary embodiments, a method of forming an immobilized hybrid ligand includes providing a linking molecule. The linking molecule includes a first end with a solid support coupling end group, a second end opposite the first end with a primary amine end group, and an amine group on the backbone of the linking molecule between the solid support coupling end group and the primary amine end group. The method also includes covalently coupling the linking molecule at the first end to a solid support by way of the solid support coupling end group. The method further includes covalently coupling the linking molecule at the second end to a terminal molecule by a terminal bond that is an amide bond or a sulfonamide bond. The terminal molecule includes multiple hydroxyl groups.

In some embodiments, the synthesis of a hybrid ligand of Formula (1) is achieved by the reaction of a diamine silane linking molecule with a lactone terminal molecule in one or more polar solvents to form an amide bond linkage between the two reactants. The lactone includes two or more hydroxyl groups. Appropriate lactones may include, but are not limited to, arabino-1,4-lactone, fucono-1,4-lactone, galactono-1,4-lactone, gluconolactone, rhamnono-1,4-lactone, ribono-1,4-lactone, and threono-1,4-lactone. The diamine silane includes a primary amine and a secondary, tertiary, or quaternary amine. Appropriate diamine silanes may have the following formula:

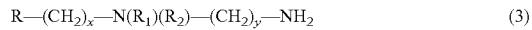

$$R-(CH_2)_x-N(R_1)(R_2)-(CH_2)_y-NH_2 \quad (3)$$

where R, $R_1$, $R_2$, x, and y are the same as described with respect to Formula (1).

In some embodiments, the bonding of the synthesized hybrid ligand (silane) onto silica through the silanol groups of the silica is accomplished by the heating of the synthesized silane with silica in the same polar solvent(s) as for the synthesis. Appropriate polar solvents for the synthesis and bonding include methanol, ethanol, dimethylformamide (DMF), dimethyl sulfoxide (DMSO), and combinations thereof.

In some embodiments, the solid support is a silica particle. The silica particle may be spherical or non-spherical. In some embodiments, a spherical silica particle has a diameter in the range of 10 nm to 100 μm, alternatively 10 nm to 1 μm, alternatively 10 nm to 100 nm, alternatively 100 nm to 1 μm, alternatively 100 nm to 10 μm, alternatively 1 μm to 100 μm, alternatively 1 μm to 10 μm, alternatively 10 μm to 100 μm, or any value, range, or sub-range therebetween. In some embodiments, a non-spherical silica particle has a maximum dimension in the range of 10 nm to 100 µm, alternatively 10 nm to 1 µm, alternatively 10 nm to 100 nm, alternatively 100 nm to 1 µm, alternatively 100 nm to 10 µm, alternatively 1 µm to 100 µm, alternatively 1 µm to 10 µm, alternatively 10 µm to 100 µm, or any value, range, or sub-range therebetween. The silica particles may be porous or non-porous. The porous silica particles may be fully porous or superficially porous. In some embodiments, the pore size of the pores of a porous silica particle is in the range of 10 Å to 1000 Å, alternatively 10 Å to 100 Å, alternatively 100 Å to 1000 Å, or any value, range, or sub-range therebetween.

In some embodiments, the solid support is an inorganic/organic hybrid particle. The inorganic/organic hybrid particle may be spherical or non-spherical. In some embodiments, a spherical hybrid particle has a diameter in the range of 10 nm to 100 µm, alternatively 10 nm to 1 µm, alternatively 10 nm to 100 nm, alternatively 100 nm to 1 µm, alternatively 100 nm to 10 µm, alternatively 1 µm to 100 µm, alternatively 1 µm to 10 µm, alternatively 10 µm to 100 µm, or any value, range, or sub-range therebetween. In some embodiments, a non-spherical hybrid particle has a maximum dimension in the range of 10 nm to 100 µm, alternatively 10 nm to 1 µm, alternatively 10 nm to 100 nm, alternatively 100 nm to 1 µm, alternatively 100 nm to 10 µm, alternatively 1 µm to 100 µm, alternatively 1 µm to 10 µm, alternatively 10 µm to 100 µm, or any value, range, or sub-range therebetween. The hybrid particles may be porous or non-porous. The porous hybrid particles may be fully porous or superficially porous. In some embodiments, the pore size of the pores of a porous hybrid particle is in the range of 10 Å to 1000 Å, alternatively 10 Å to 100 Å, alternatively 100 Å to 1000 Å, or any value, range, or sub-range therebetween.

In some embodiments, the solid support is a polymeric particle. Appropriate materials for polymeric particles of a solid support may include, but are not limited to, polystyrene divinylbenzene (PSDVB), poly(vinyl alcohol) (PVA), and polymethyl methacrylate (PMMA).

In some embodiments, the solid support is a silica-based monolith, a hybrid inorganic/organic monolith, or a polymer-based monolith. The monolith may be porous or non-porous. In some embodiments, the pore size of the pores of a porous monolith is in the range of 10 Å to 1000 Å, alternatively 10 Å to 100 Å, alternatively 100 Å to 1000 Å, or any value, range, or sub-range therebetween.

In some embodiments, the stationary phase is a packing material for a packed column. In some embodiments, the column has a length in the range of 0.5 cm to 50 cm, alternatively 0.5 cm to 5 cm, alternatively 5 cm to 50 cm, or any value, range, or sub-range therebetween and an inner diameter in the range of 50 µm to 50 cm, alternatively 50 µm to 5 mm, alternatively 500 µm to 5 cm, alternatively 50 µm to 500 µm, alternatively 500 µm to 5 mm, alternatively 5 mm to 50 cm, alternatively 5 mm to 5 cm, alternatively 5 cm to 50 cm, or any value, range, or sub-range therebetween. Appropriate materials for the column may include, but are not limited to, stainless steel, glass, fused silica, and a polymer.

In some embodiments, the stationary phase is contained in a cartridge, in a tube, or on a well plate.

A chromatography column including a hybrid ligand is capable of serving as an AEX HILIC column, or a combination thereof, depending on the polar analytes being eluted and the solvents or solvent gradient being applied to the column. Since the hybrid ligand includes different functional groups effecting different chromatographic retention and separation mechanisms, multimodal chromatography separations may be accomplished with a single hybrid ligand-based stationary phase.

In some embodiments, a method of separating polar analytes includes providing a solution containing a first polar analyte and a second polar analyte. The method also includes applying the solution to a stationary phase including an immobilized hybrid ligand. The immobilized hybrid ligand includes an amine group, an amide group or a sulfonamide group, and multiple hydroxyl groups. The method further includes applying an elution solvent to the stationary phase such that the first polar analyte and the second polar analyte pass through the stationary phase with different elution times. The method yet further includes collecting the first polar analyte leaving the stationary phase at a first elution time and collecting the second polar analyte leaving the stationary phase at a second elution time after the first elution time. The method may further include detecting the first polar analyte leaving the stationary phase at a first elution time and detecting the second polar analyte leaving the stationary phase at a second elution time after the first elution time.

The amine group of the ligand provides the anion exchange functionality and the hybrid ligand as a whole provides the HILIC functionality. The mixed mode is especially beneficial in separating analytes with both acidic and basic groups, such as amino acids.

EXAMPLES

The invention is further described in the context of the following examples, which are presented by way of illustration, not of limitation.

Example 1

A hybrid ligand was synthesized by the reaction of 3-(2-aminoethylamino)propyldimethoxymethylsilane with D-(+)-gluconic acid δ-lactone under an inert argon atmosphere overnight in anhydrous DMF, DMSO, ethanol, methanol, or a mixture thereof. The synthesized hybrid ligand was bonded onto porous or non-porous silica gel particles in the same synthesis solvent by heating the synthesis crude with silica overnight at 60° C. to form the immobilized hybrid ligand of Formula (4):

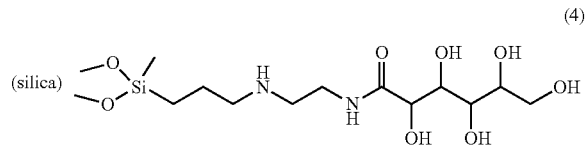 [SMILES: CO[Si](C)(CCCNCCNC(=O)C(O)C(O)C(O)C(O)CO)OC]

(4)

where the oxygens shown bonded to the silica in Formula (4) are bonded to silicon atoms of the silica.

Example 2

A one-pot process created the hybrid ligand of Formula (4) and immobilized it onto 5.5 g of superficially porous silica particles in a mixed 2:1 DMF:ethanol (v/v) or 2:1 DMF:methanol (v/v) solvent.

In this one-pot process, the creation and immobilization of the ligand onto silica was performed simultaneously in the same flask and solvent. An amount of 5.5 g of superficially porous silica particles (2.7 μm, ~90 Å, ~120 m²/g) was first heated and vacuum dried in a 250-mL 3-neck flask overnight and allowed to cool to 60° C. The flask was stoppered, removed from the oven, and transferred into a fume hood. Within the fume hood the flask was placed on a heating mantle with the controller and its contents immediately secured under dry argon pressure by removing one of the stoppers and replacing it with a 24/40 fitted gas inlet. Another stopper was then removed and replaced with a 20-25 cm long and previously dried 24/40 reflux condenser. A 24/40 gas bubbler containing an inert medium was placed at the top of the condenser and the gas flow adjusted to maintain minimal positive pressure within the flask to prevent atmospheric intrusion as witnessed by gas escaping through the bubbler. An amount of 120 mL of anhydrous DMF and 60 mL of anhydrous ethanol (or methanol) was cannulated into an additional funnel and mixed with silica with stirring. Once the silica was dispersed, 1.1 g of D-(+)-gluconic acid δ-lactone and then 1.2 mL of 3-(2-aminoethylamino)propyldimethoxymethylsilane were added into the flask. The flask was capped with the stoppers and kept under argon. The argon rate was adjusted so that a bubble emerged every 3-5 seconds. The reaction (the mixture in the flask) was heated to 35° C. with stirring and maintained overnight.

After reaction, the mixture was transferred to an open filtration flask equipped with a 1-mm thick, 1-μm pore size polytetrafluoroethylene (PTFE) filter disc. The mother liquor was removed, and the resultant bonded silica particle mass was then washed three times with 100 mL of methanol, taking care to re-suspend the particles in the starting wash solvent by stirring with a spatula each time prior to applying vacuum for the second and third washes. Incorporating the same resuspension technique, the silica was then washed three times with 100 mL of 80% methanol in water (v/v), and then finally three times with 100 mL of acetonitrile. Following the final solvent wash, the filter cake was air-dried for approximately 20 minutes while the apparatus was still under vacuum to produce a loose powder that was transferred to a drying dish to dry for at least 20 hours at 60° C. within a vacuum oven.

CHN analysis resulted in the following: 2.823% carbon (C), 0.478% hydrogen (H), and 0.590% nitrogen (N) with 2:1 DMF:ethanol (v/v) and 3.003% C, 0.562% H, and 0.631% N with 2:1 DMF:methanol (v/v), as the solvent, respectively.

Example 3

A two-pot process formed the hybrid ligand of Formula (4) and immobilized it onto 5.5 g of superficially porous silica particles in methanol or mixed 2:1 DMSO:methanol (v/v) solvent.

In this process, the creation and immobilization of the ligand onto silica were performed in two separate flasks but in the same solvent. The ligand was synthesized by the reaction of 1.2 g of D-(+)-gluconic acid δ-lactone and 1.2 mL of 3-(2-aminoethylamino)propyldimethoxymethylsilane in 50 mL of anhydrous methanol or mixed 2:1 DMSO:methanol (v/v), in a dried 250-mL pressure flask. The pressure vessel was sealed and stirred overnight at room temperature or at 60° C. After overnight reaction, the resultant solution was poured onto 5.5 g of dried superficially porous silica particles (2.7 μm, 83.7 Å, 123.1 m²/g) in a 250-mL 3-neck flask with 24/40 joints. The 3-neck flask was fitted with a stir bar, two glass stoppers, and a glass-fritted gas inlet adaptor. The 3-neck flask was moved to a fume hood where it was secured in a heating mantle connected to a heat controller. The gas inlet was connected to an argon line and one stopper was replaced with a gas bubbler. The other stopper was replaced with a 24/40 adaptor fitted with a ¼ inch J-type Teflon-coated thermocouple. The argon rate was adjusted so that a bubble emerged every 3-5 seconds.

The synthesized ligand was immobilized onto the silica by maintaining the reaction at 60° C. with heating and with stirring for 20 hours. The reaction was cooled to 45° C. before cannulating the mixture into a controlled dry atmosphere Rusek funnel that was fitted with a 1-mm thick, 1-μm pore size PTFE filter disc and continuously purged with argon. The mother liquor was filtered off, and the resultant bonded silica particle mass was then washed three times with 100 mL of anhydrous 2:1 DMSO:methanol (v/v), taking care to re-suspend the particles in the wash solvent by stirring with a spatula each time, prior to applying vacuum and removing the wash solvent for the second and third washes. Incorporating the same resuspension technique, the silica was then washed three times with 100 mL of 20% acetonitrile in water (v/v), and then finally three times with 100 mL of acetonitrile. The argon was not used after the initial DMSO/methanol washes. Following the final solvent wash, the filter cake was air-dried for about 20 minutes while the apparatus was still under vacuum, then the mass was transferred to a drying dish and dried for at least 20 hours at 60° C. in a vacuum oven.

CHN analysis resulted in the following: 3.63% C, 0.68% H, 0.68% N with methanol, and 3.16% C, 0.55% H, 0.60% N with 2:1 DMSO:methanol (v/v) as the solvent, respectively.

Example 4

A two-pot process created the hybrid ligand of Formula (4) and immobilized it onto 5.5 g of larger pore (160 Å) silica particles in mixed 2:1 DMSO:methanol (v/v) solvent.

In this process, the creation and immobilization of the ligand onto 160 Å pore silica were performed in two separate flasks but in the same solvent. The ligand was synthesized by the reaction of 0.86 g D-(+)-gluconic acid δ-lactone and 0.81 mL 3-(2-aminoethylamino)propyldimethoxymethylsilane in 180 mL of anhydrous mixed 2:1 DMSO:methanol (v/v), in a 250-mL pressure flask. The pressure vessel was sealed and heated to 30° C. with stirring for overnight. After overnight reaction, the resultant solution was poured onto 5.5 g dried superficially porous silica particles (2.7 μm, ~160 Å, 82.2 m²/g) in a 250-mL 3-neck flask with 24/40 joints. The 3-neck flask was fitted with a stir bar, two glass stoppers, and a glass-fritted gas inlet adaptor. The 3-neck flask was moved to a fume hood, where it was secured in a heating mantle connected to a heat controller. The gas inlet was connected to an argon line and one stopper was replaced with a gas bubbler. The other stopper was replaced with a 24/40 adaptor fitted with a ¼ inch J-type Teflon-coated thermocouple. The argon rate was adjusted so that a bubble emerged every 3-5 seconds.

The synthesized ligand was immobilized onto the silica by heating the reaction to 60° C. with stirring for 23 hours. The reaction was cooled to room temperature before transfer into a vacuum funnel that was fitted with a 1-mm thick, 1-μm pore size PTFE filter disc. The mother liquor was removed, and the resultant bonded silica particle mass was then washed, taking care to re-suspend the particles in the following wash solvents by stirring with a spatula each time before the start of filtration: once with 100 mL of anhydrous 2:1 DMSO:methanol (v/v), once with 100 mL of 50% acetonitrile in water (v/v), three times with 100 mL of 20% acetonitrile in water (v/v), once with 100 mL of 50% acetonitrile in water (v/v), and finally three times with 100 mL of acetonitrile. Following the final solvent wash, the filter cake was air-dried for about 20 minutes while the apparatus was still under vacuum, then the mass was transferred to a drying dish and dried for at least 20 hours at 60° C. in a vacuum oven.

CHN analysis resulted in the following: 1.849% C, 0.450% H, and 0.406% N.

Example 5

A two-stage process created the hybrid ligand of Formula (4) and immobilized it onto 5.5 g of superficially porous silica particles. In this process, the silica surface was first modified with amine silane and then the immobilized amine groups on the silica reacted with lactone reagent to form the immobilized hybrid ligand of Formula (4).

During the first stage, the amine silane 3-(2-aminoethylamino)propyldimethoxymethylsilane was immobilized onto the superficially porous silica particles (2.7 µm, ~90 Å, 125 $m^2/g$). An amount of 5.5 g silica was first heated and vacuum dried in a 250-mL 3-neck flask overnight and allowed to cool to 60° C. The flask was stoppered, removed from the oven, and transferred into a fume hood. Within the fume hood, the flask was placed on a heating mantle with the controller and its contents immediately secured under dry argon pressure by removing one of the stoppers and replacing it with a 24/40 fritted gas inlet. Another stopper was then removed and replaced with a 20-25 cm long, previously dried 24/40 reflux condenser. A 24/40 gas bubbler containing an inert medium was placed at the top of the condenser and the gas flow adjusted to maintain minimal positive pressure within the flask to prevent atmosphere intrusion as witnessed by gas escaping through the bubbler. An amount of 180 mL of anhydrous toluene was cannulated into an additional funnel and mixed with silica with stirring. Once the silica was dispersed, 1.17 mL of 3-(2-aminoethylamino)propyldimethoxymethylsilane was then added and the flask stoppered with the thermal probe and adapter.

Heat was then applied to raise the temperature to 110° C. to produce gentle reflux for 16 hours. After reaction completion, the temperature was reduced to 50° C. and the mixture was transferred to an open filtration flask equipped with a 1-mm thick, 1-µm pore size PTFE filter disc. The mother liquor was removed, and the resultant bonded silica particle mass was then washed, taking care to re-suspend the particles in the following wash solvents by stirring with a spatula each time before the start of filtration: once with 100 mL of methanol, once with 100 mL of toluene, once with 100 of methanol, once with 100 mL of toluene, and finally once with 100 mL of methanol. Following the final solvent wash, the filter cake was air-dried for about 20 minutes while the apparatus was still under vacuum. The mass was then transferred to a drying dish and dried for at least 20 hours at 60° C. in a vacuum oven.

CHN analysis resulted in the following: 2.40% C, 0.71% H, and 0.93% N.

The second stage of the process converted the prepared silica with immobilized amine into the immobilized hybrid ligand of Formula (4). Before the reaction, 1.50 g of the silica previously bonded with 3-(2-aminoethylamino)propyldimethoxymethylsilane was vacuum dried at 60° C. overnight in a 250-mL 3-neck flask with a PTFE-coated magnetic stir bar. The flask was transferred into a fume hood and placed on a heating mantle with a controller. 60 mL of mixed 2:1 water:ethanol solvent (v/v) was added to the flask with stirring to suspend the silica. The silica suspension was heated to a temperature of 35° C. A solution of 0.11 g D-(+)-gluconic acid δ-lactone was prepared in 60 mL of mixed 2:1 water:ethanol (v/v) solvent and dispensed dropwise into the flask over a period of 8 hours. The reaction was allowed to continue for an additional 16 hours at 35° C.

After reaction, the mixture was transferred to an open filtration flask equipped with a 1-mm thick, 1-µm pore size PTFE filter disc. The mother liquor was removed, and the resultant bonded silica particle mass was then washed, taking care to re-suspend the particles in the following wash solvents by stirring with a spatula each time before the start of filtration: once with 100 mL of methanol, three times with 80% methanol in water (v/v), and finally three times with 100 mL of acetonitrile. Following the final solvent wash, the filter cake was air-dried for about 20 minutes while the apparatus was still under vacuum. The mass was then transferred to a drying dish and dried for at least 20 hours at 60° C. in a vacuum oven.

CHN analysis resulted in the following: 1.104% C, 0.249% H, and 0.335% N.

Example 6

FIG. 1 shows a representative $^{13}C$ nuclear magnetic resonance (C-13 NMR) spectrum of the hybrid ligand of Formula (4) immobilized onto superficially porous silica (2.7 µm, ~90 Å, 125 $m^2/g$) with labeled peaks at −4.22 ppm; 13.19 ppm; 21.92 ppm; 38.9 ppm; 50.45 ppm; 64.37 ppm; 72.08 ppm; and 176.85 ppm. The peak at 176.85 ppm corresponds to the carbonyl group carbon of the synthesized ligand, the peaks at 72.08 and 64.37 ppm correspond to the carbons of the C—OH groups, and the peaks at 54.45 and 38.9 correspond to the carbons connected to the secondary amine (—NH—). The presence of these peaks indicates successful synthesis and immobilization of the hybrid ligand of Formula (4).

Example 7

Figure 2:
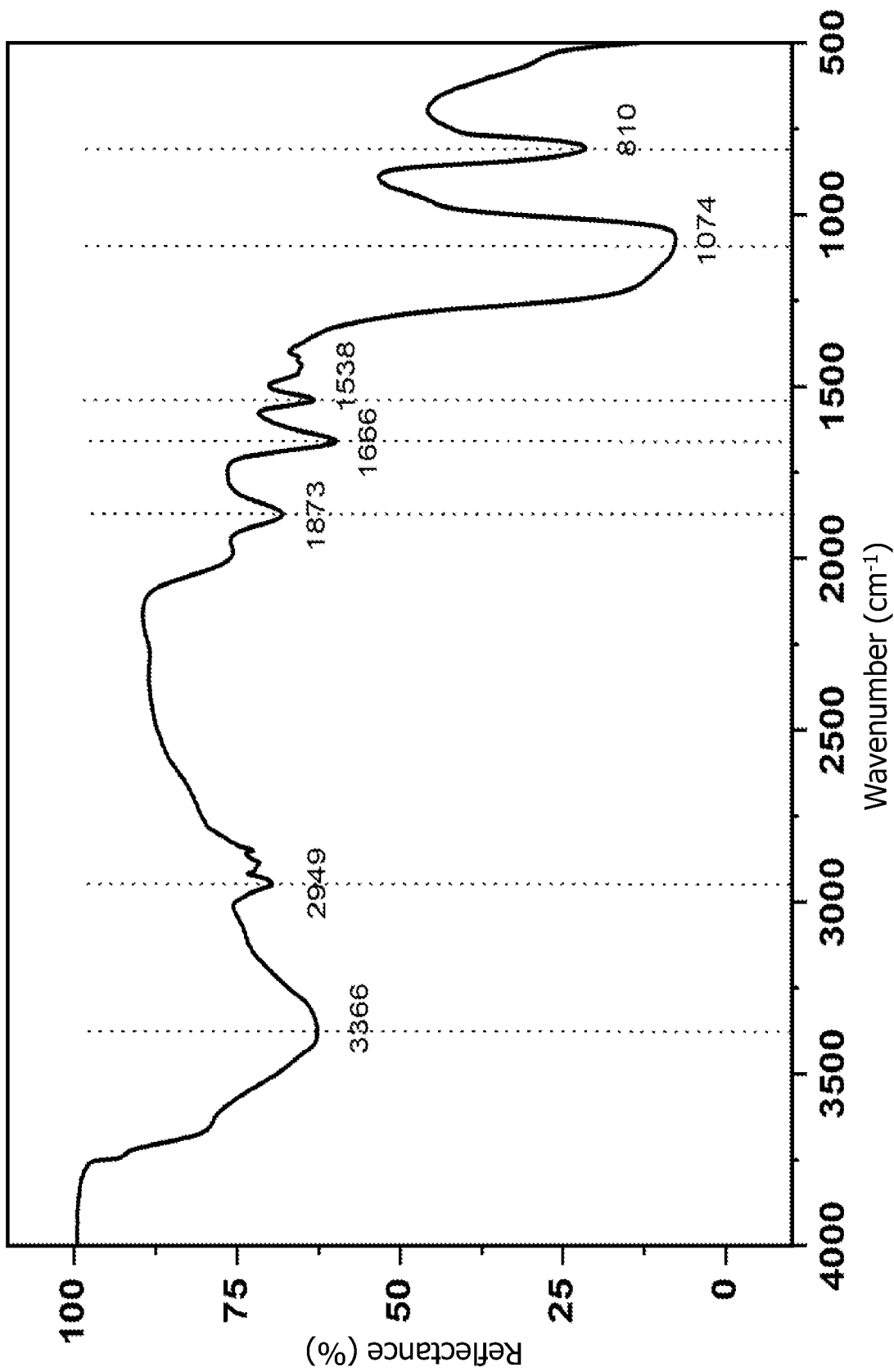
FIG. 2 shows an infrared spectrum of a hybrid ligand of the present disclosure.

Infrared spectroscopy was performed on the immobilized hybrid ligand of Example 1. FIG. 2 shows the resulting spectrum. Peaks were observed at 3366, 2949, 1873, 1666, 1538, 1074, and 810 $cm^{-1}$. The broad peak at 3366 may be related to O—H stretching and 1837 to O—H bending, respectively. The double peaks of 1666 and 1538 indicate the presence of amide bonds. These results are consistent with the chemical structure of the hybrid ligand of Formula (4), which contains one amide group and multiple hydroxyl groups.

Example 8

Seven different samples of immobilized hybrid ligand of Formula (4) were formed and tested to evaluate reproducibility between lots. One used a silica lot with a surface area of 124.6 $m^2/g$, five used a silica lot with a surface area of 123.1 $m^2/g$, and one used a silica lot with a surface area of 123.7 $m^2/g$. These samples were made at different times over a period of about three months by two different operators. Each sample was packed into an HPLC column and evaluated chromatographically with three water-soluble vitamins: thiamine (B1), nicotinic acid (B3), and folic acid (B9). The column was 2.1 mm×50 mm with 2.7-µm superficially-porous particles (SPP).

Figure 3:
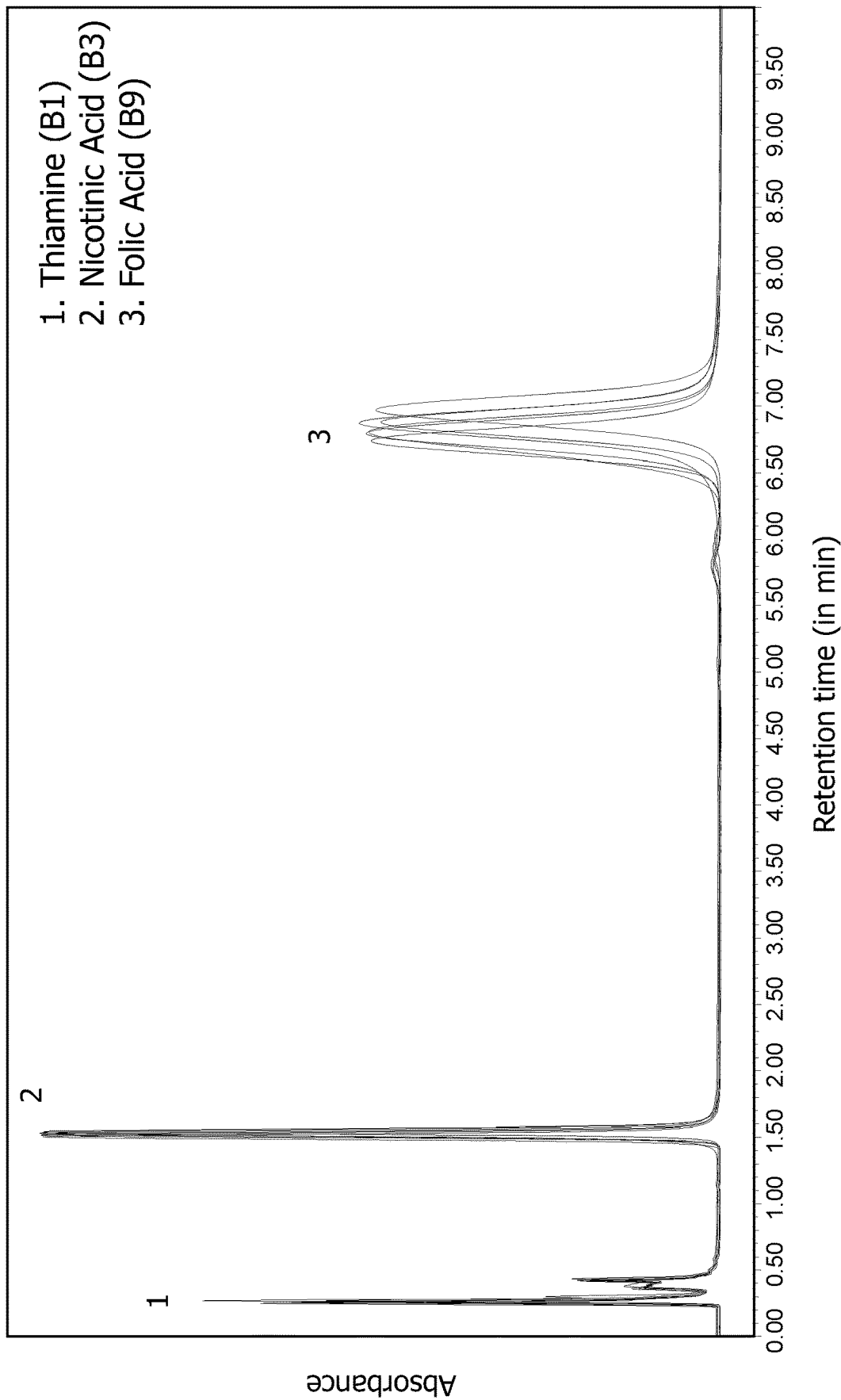
FIG. 3 shows reproducibility of seven different lots of immobilized hybrid ligand of the present disclosure.

The elution results are shown in FIG. 3, where B1 elutes first at the void time, B3 elutes second, and B9 elutes third. The three compounds were eluted under isocratic conditions with 0.1% (v/v) formic acid in 50% (v/v) acetonitrile/water as the mobile phase and at a flow rate 0.4 mL/min. The set of first peaks (B1) and the set of second peaks (B3) each had a relative standard deviation (RSD) of less than 1%. The set of third peaks (B9) had an RSD of only 2.4%, even though its retention factor is about 25. The low RSDs of the testing results indicate the procedure for preparation of ligand and immobilization of the ligand onto silica results in an immobilized ligand that is highly reproducible.

Example 9

A mixture of 22 amino acids including the twenty amino acids encoded by the universal genetic code was applied to a column containing silica bonded with the hybrid ligand of Formula (4). These amino acids may be categorized into four groups according to their side chains: non-polar, polar, positively-charged, and negatively-charged.

Mixed anion-exchange-hydrophilic interaction chromatography liquid chromatography-mass spectrometry (AEX/HILIC LC/MS) conditions were selected to separate and detect the underivatized amino acid analytes. The column was 2.1 mm×100 mm with 2.7 μm superficially-porous particles (SPP).

A solvent gradient was applied to the mixture on the column using a first solvent (mobile phase A) of 0.5% (v/v) formic acid in water and a second solvent (mobile phase B) of 90% (v/v) acetonitrile and 10% (v/v) water with 20 mM ammonium formate (pH 3.0). The mobile phase gradient started with holding at 88% (v/v) mobile phase B for 3.5 minutes and then lowering to 30% mobile phase B over 4.5 minutes. The underivatized amino acids were detected by electrospray ionization mass spectrometry under positive mode.

Figure 4:
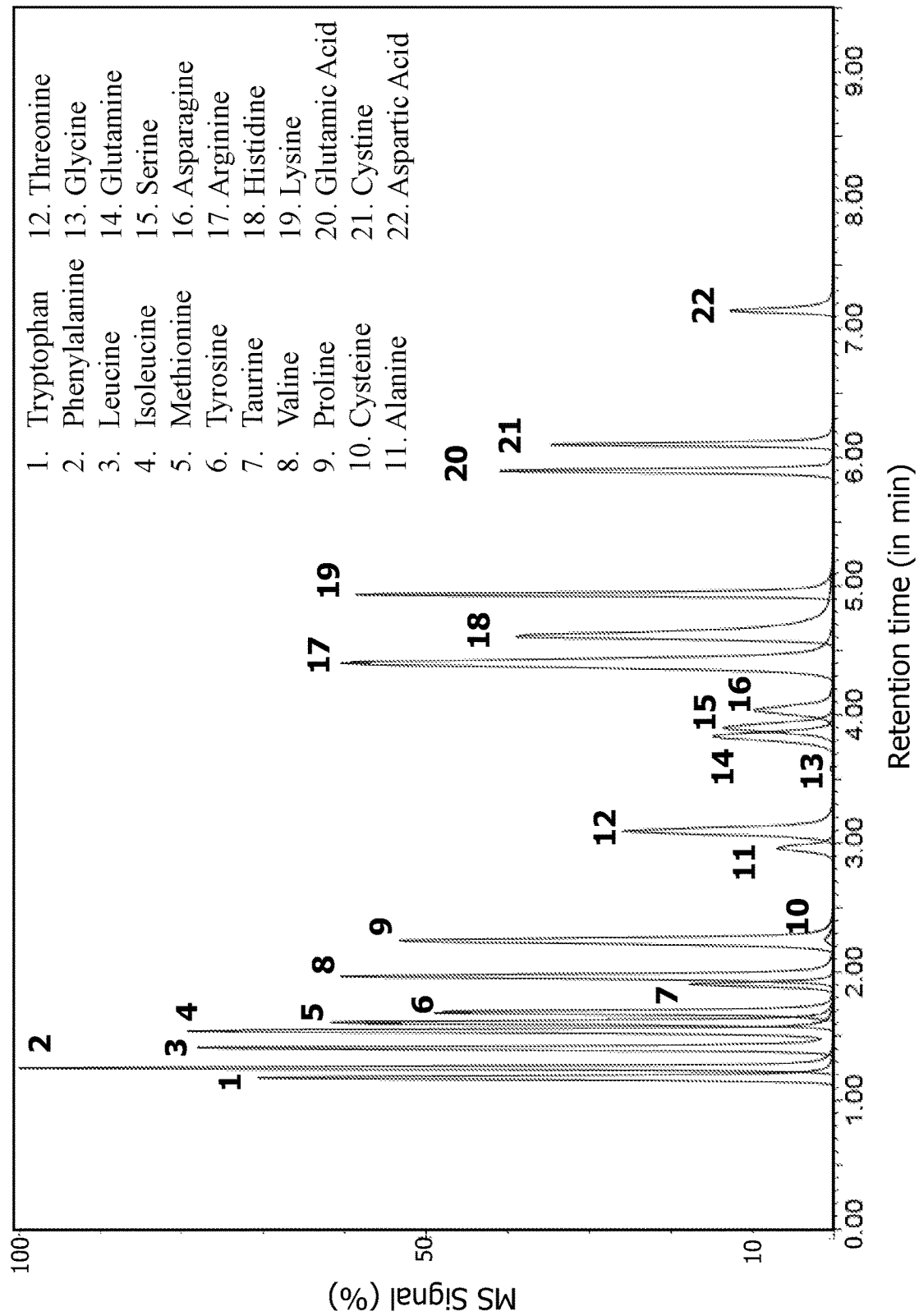
FIG. 4 shows LC/MS separation results for amino acids with an immobilized hybrid ligand of the present disclosure.

As shown by the chromatogram of FIG. 4, the 22 underivatized amino acids were all separated by and eluted from the 10-cm length column within 8 minutes. The non-polar amino acids eluted first, followed by the polar, positively-charged amino acids (Arg, His, and Lys), and lastly the polar, negatively-charged amino acids (Glu and Asp). The baseline resolution of the isobaric amino acid pair, Leu and Ile, is especially noteworthy.

Example 10

A column containing silica bonded with the hybrid ligand of Formula (4) was applied to the LC/MS analysis of a mixture of the polar acidic herbicides aminomethylphosphonic acid (AMPA), glufosinate, and glyphosate. The column (2.1 mm×30 mm, with 2.7 μm SPP particles) was operated under anion exchange conditions with a mobile phase including 5% (v/v) acetonitrile, 0.3% (v/v) formic acid and 30 mM ammonium formate and a flow rate of 0.3 mL/min. The analytes were detected by mass spectrometry via selected ion monitoring in the positive mode.

Figure 5:
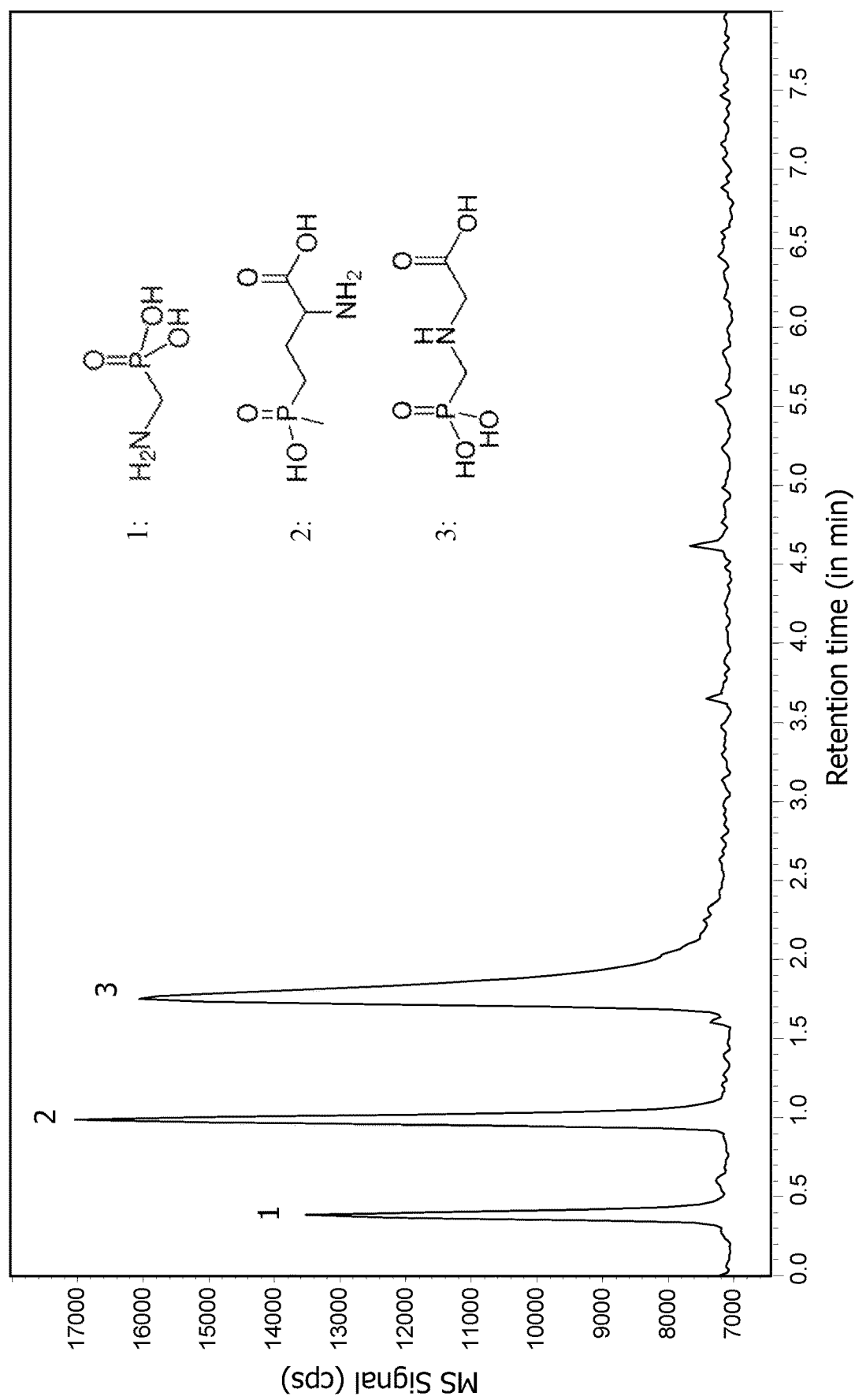
FIG. 5 shows LC/MS separation results for polar acidic herbicides with an immobilized hybrid ligand of the present disclosure under a first set of elution parameters.

As shown by the chromatogram of FIG. 5, good separation of the three analytes was achieved in a short run time of less than 3 minutes, with no ethylenediaminetetraacetic acid (EDTA) in the mobile phase or samples, and with no need to flush the system between runs. The separation demonstrates the anion-exchange interactions of the ligand and the polar acidic herbicides. The AMPA (1) eluted first with a retention time of less than 30 seconds, the glufosinate (2) eluted second with a retention time of about one minute, and the glyphosate (3) eluted third with a retention time of slightly less than two minutes.

Example 11

A column containing silica bonded with the hybrid ligand of Formula (4) was applied to the LC/MS analysis of a mixture of the polar acidic herbicides AMPA (100 ng/mL), glufosinate (100 ng/mL), and glyphosate (100 ng/mL). The column (2.1 mm×30 mm, with 2.7 μm SPP particles) was operated with a first mobile phase (A) including 0.5% (v/v) formic acid in water without buffer salts and a second mobile phase (B) including 0.5% (v/v) formic acid in acetonitrile with a flow rate of 0.6 mL/min. The gradient mobile phase started with 60% A/40% B and transitioned to 100% A by 1 minute and held at 100% A for 3 minutes. From 4 to 4.01 minutes, the gradient mobile phase transitioned back to 60% A/40% B. The analytes were detected by mass spectrometry via multiple reaction monitoring in the negative mode.

Figure 6:
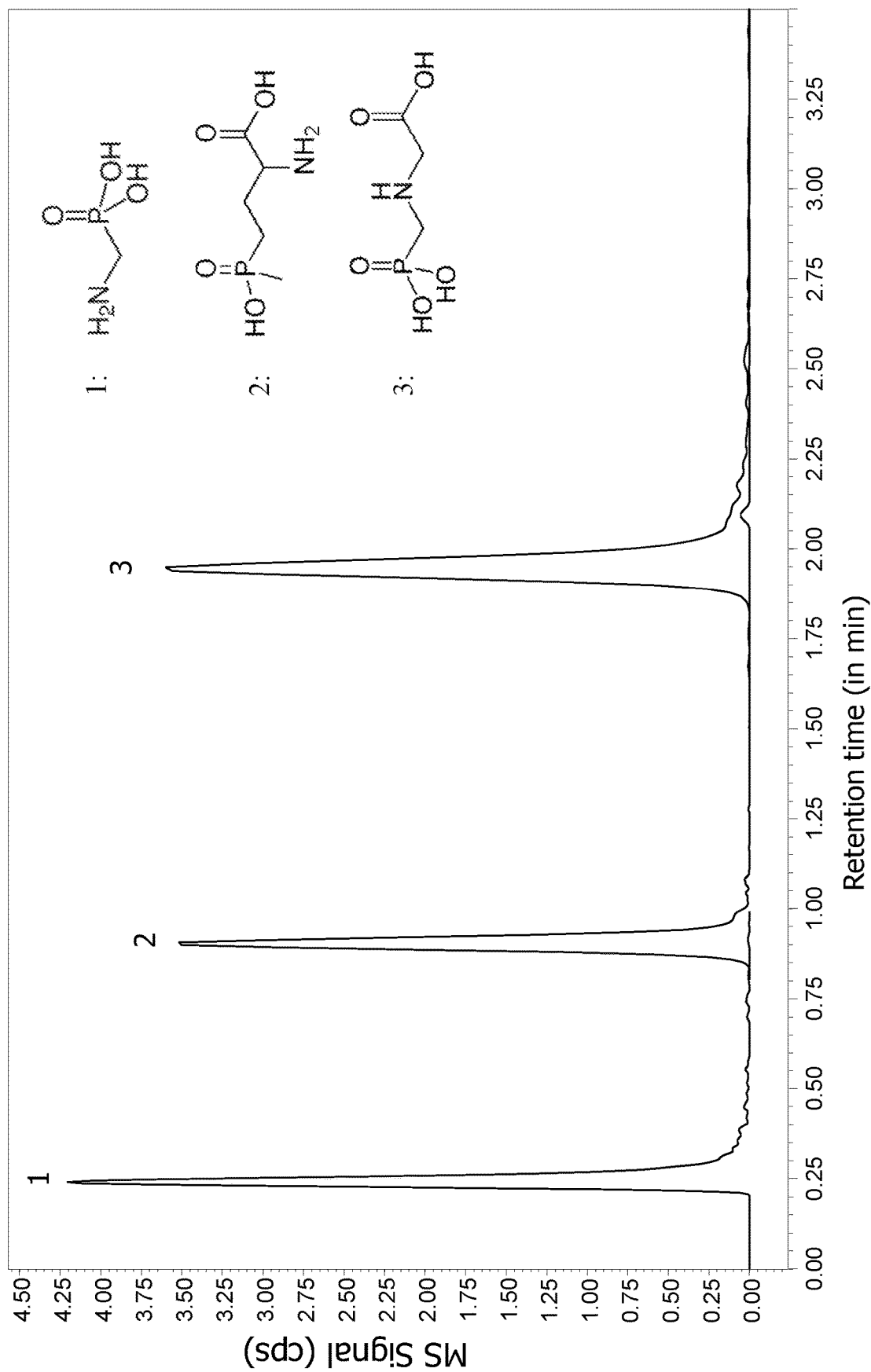
FIG. 6 shows LC/MS separation results for polar acidic herbicides with an immobilized hybrid ligand of the present disclosure under a second set of elution parameters.

As shown by the chromatogram of FIG. 6, good separation of the three analytes was achieved in a short run time of three minutes, with no EDTA in the mobile phase or samples and with no need to flush the system between runs. The separation demonstrates the anion-exchange interactions of the ligand and the polar acidic herbicides. The AMPA (1) eluted first with a retention time of 15 seconds and a tailing factor of 1.35, the glufosinate (2) eluted second with a retention time of 0.9 minutes and a tailing factor of 1.04, and the glyphosate eluted third with a retention time of 1.95 minutes and a tailing factor of 1.15. The sharp and symmetric peak shape for each compound was noteworthy, as all three compounds are notoriously difficult to retain and separate chromatographically. Examples 10 and 11 demonstrate the versatility of an immobilized hybrid ligand in that similar separations may be achieved with different running conditions, with the separation results in Example 11 being slightly better than in Example 10.

Example 12

A column containing silica bonded with the hybrid ligand of Formula (4) was applied to the HPLC separation of a mixture of the neutral glycosylated analytes salicin, naringin, and amygdalin. Salicin only has one sugar unit while naringin and amygdalin include two sugar units in the molecules. The column (2.1 mm×50 mm, with 2.7 μm SPP particles) was operated under HILIC conditions with a mobile phase with a high (95%, v/v) acetonitrile content and with 0.1% (v/v) formic acid with a flow rate of 0.4 mL/min and ultraviolet (UV) detection.

Figure 7:
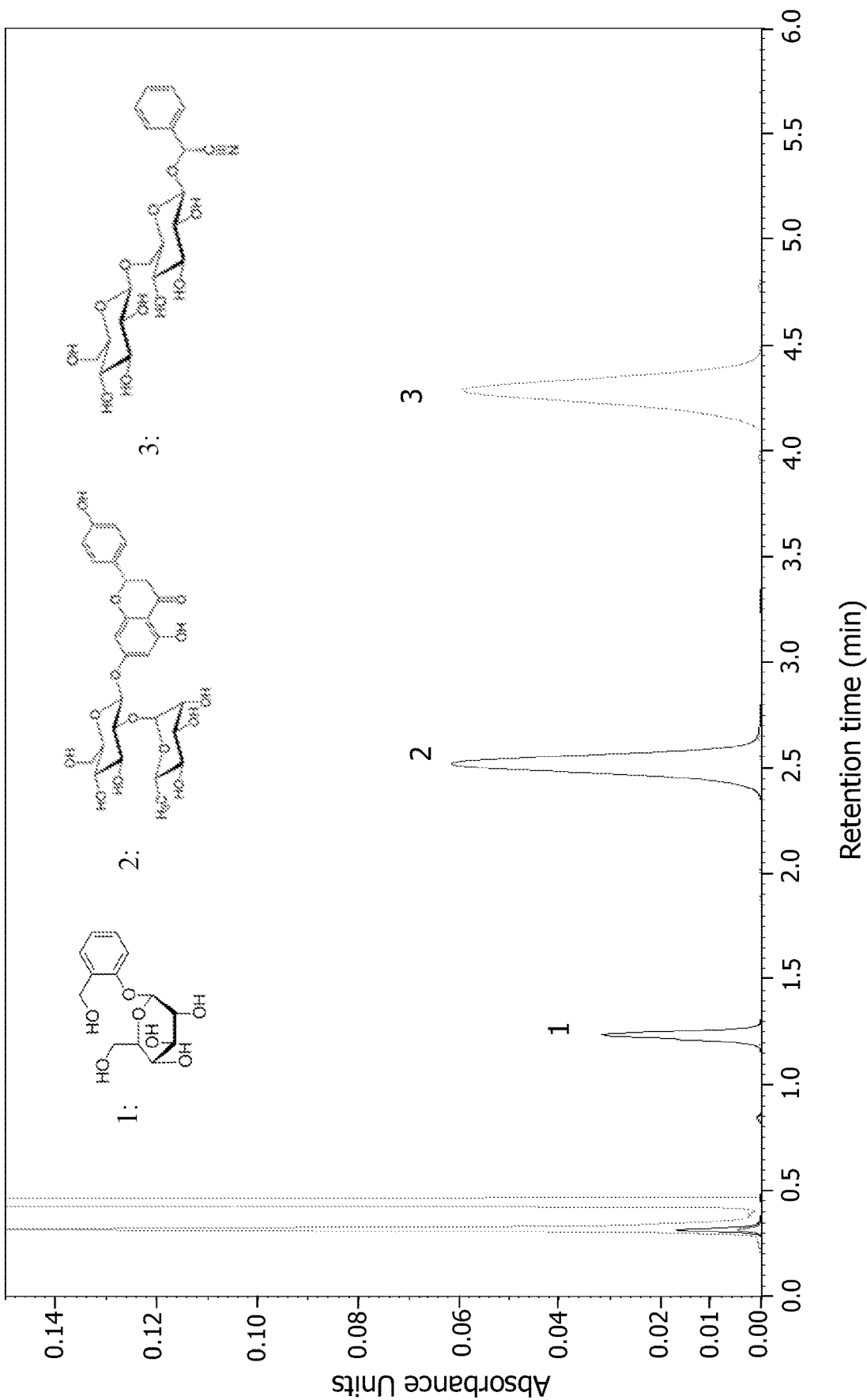
FIG. 7 shows HILIC separation results for neutral glycosylated analytes under high acetonitrile conditions with an immobilized hybrid ligand of the present disclosure.

As shown by the chromatogram of FIG. 7, the three polar glycosylated analytes were well-resolved by the column, as a result of good selectivity of the hybrid stationary phase toward the polar sugar groups. The salicin (1) eluted first with a retention time of about 1.25 minutes, the naringin (2) eluted second with a retention time of about 2.5 minutes, and the amygdalin (3) eluted third with a retention time of about 4.3 minutes. A high retention of these small glycosylated analytes was observed, with a retention factor (k) of 5 for salicin, 10 for naringin, and 16 for amygdalin, respectively.

Example 13

A column containing silica bonded with the hybrid ligand of Formula (4) was applied to the HPLC separation of a mixture of three water-soluble vitamins: thiamine (Vitamin B1), nicotinic acid (Vitamin B3), and folic acid (Vitamin B9). Vitamin B1 is a permanently positively-charged molecule, while Vitamin B3 and Vitamin B9 molecules have one and two carboxylic groups, respectively. The column (2.1 mm×50 mm column with 2.7 μm SPP particles) was operated under anion-exchange chromatographic conditions with a mobile phase including 0.1% (v/v) formic acid in 50% (v/v) acetonitrile/water and, a flow rate of 0.4 mL/min, and UV detection.

Figure 8:
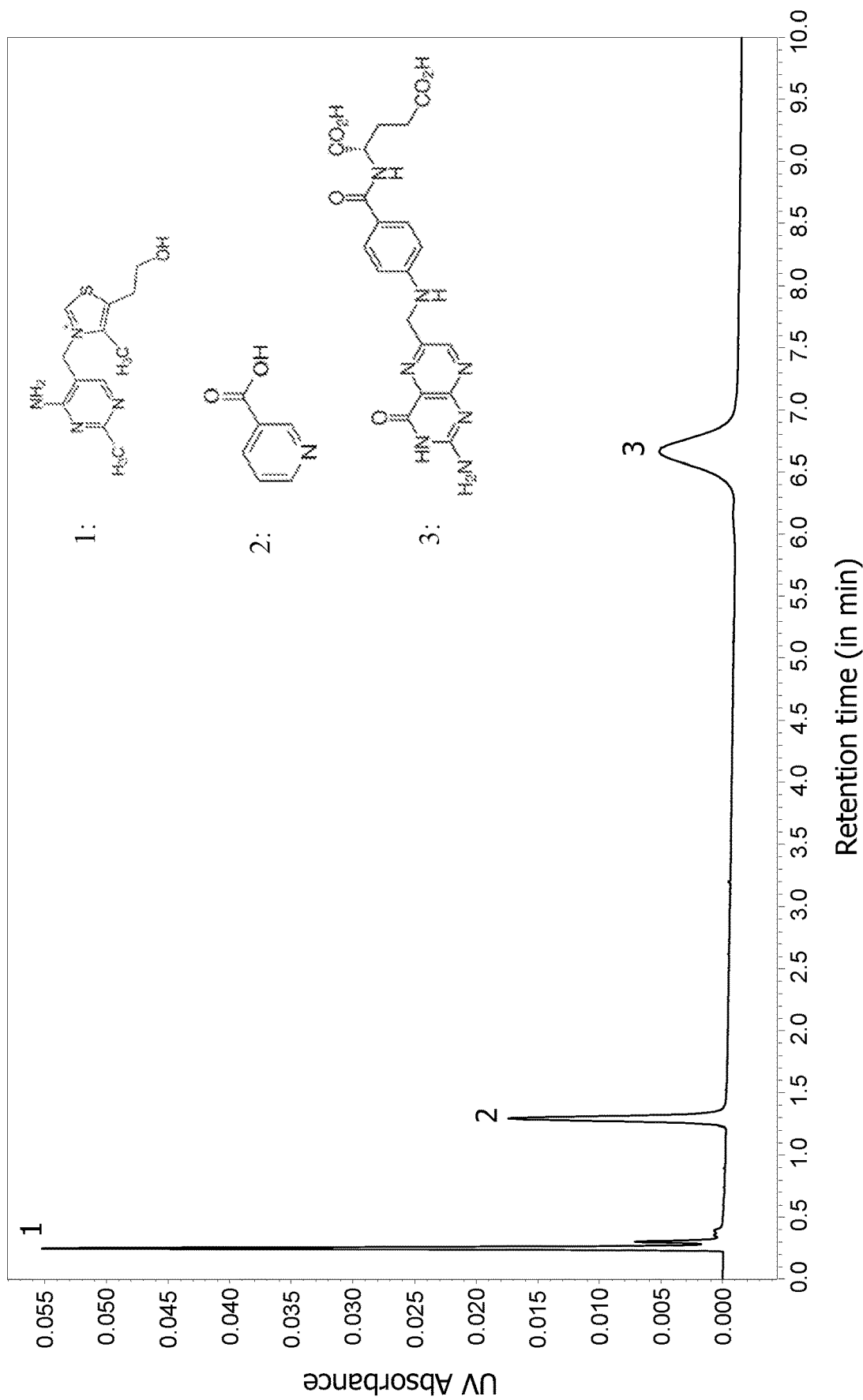
FIG. 8 shows anion-exchange separation/electrostatic repulsion results for water-soluble vitamins with an immobilized hybrid ligand of the present disclosure.

As shown by the chromatogram of FIG. 8, the three vitamin analytes were well-resolved by the column under anion-exchange chromatographic conditions. The positively-charged Vitamin B1 (1) was essentially not retained at all and eluted in less than 0.3 minutes, Vitamin B3 (2) with one carboxylic group eluted second with a retention time of about 1.3 minutes, and Vitamin B9 (3) with two carboxylic groups eluted last with a retention time of about 6.7 minutes.

In an alternative elution (not shown), Vitamin B1 came off the same column (2.1 mm×50 mm, with 2.7 μm SPP particles) at about 2.3 minutes under HILIC retention conditions with a high organic buffered mobile phase. The mobile phase was 90% (v/v) acetonitrile/10% (v/v) water with 10 mM ammonium formate. The retention factor of Vitamin B1 was about 8 with a flow rate of 0.4 mL/min, where $T_0$ was 0.256 minutes. The buffer salts reduced the electrostatic repulsion and the high organic content promoted retention through HILIC partitioning such that HILIC became the dominant interactions.

Example 14

Thiamine pyrophosphate was applied to a column containing silica bonded with the hybrid ligand of Formula (4). The column (2.1 mm×50 mm, with 2.7 μm SPP particles) was operated under HILIC and then anion exchange conditions, with a first mobile phase (A) including 50 mM ammonium formate and 0.1% (v/v) formic acid in water and a second mobile phase (B) including 50 mM ammonium formate and 0.1% (v/v) formic acid in 90/10 (v/v) acetonitrile/water with a flow rate of 0.5 mL/min.

The gradient mobile phase started with 5% A/95% B to two minutes, then transitioned to 100% A by 8 minutes, and then remained at 100% A to the end of the elution.

Figure 9:
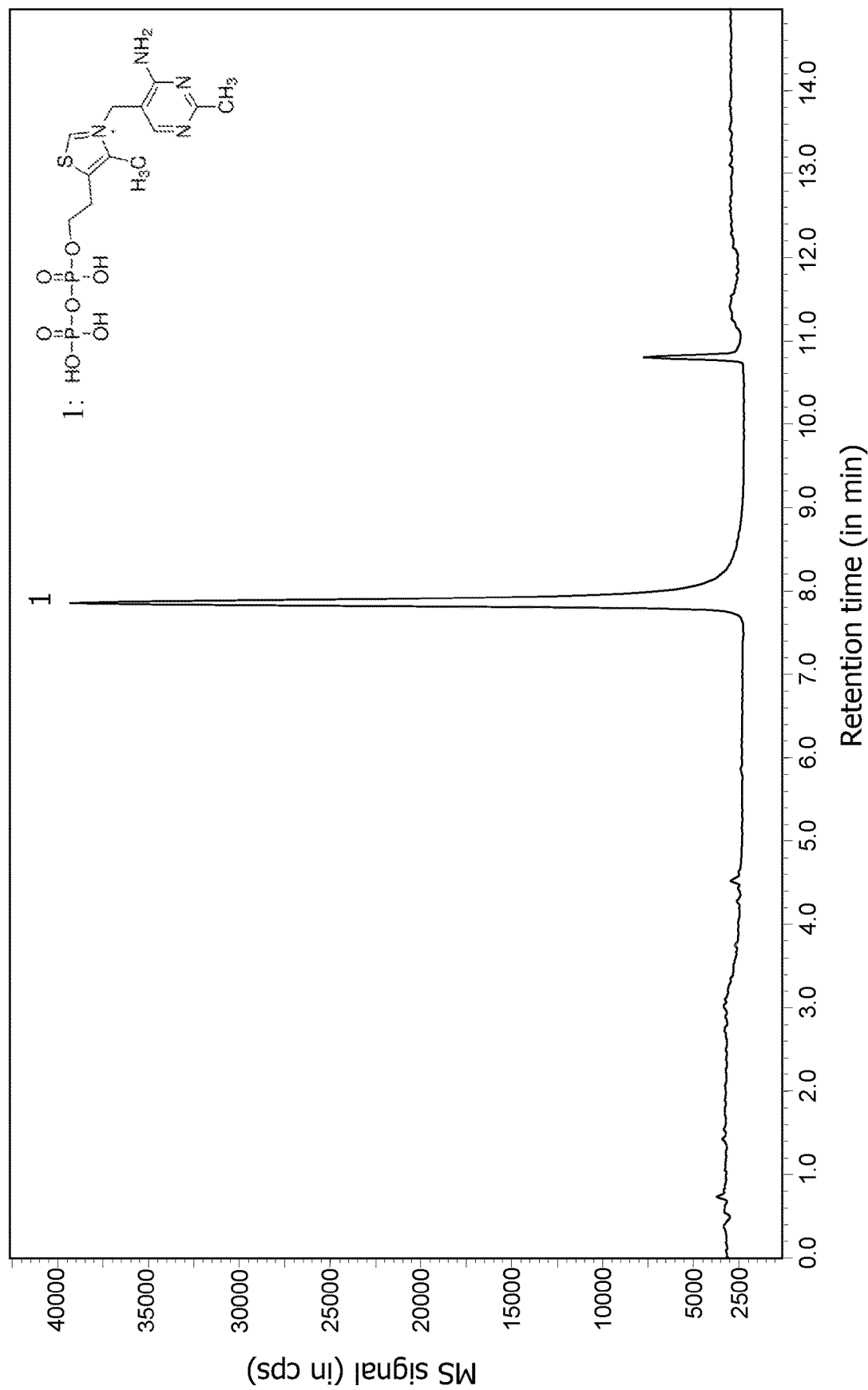
FIG. 9 shows LC/MS separation results for thiamine pyrophosphate with an immobilized hybrid ligand of the present disclosure.

As shown by the chromatogram of FIG. 9, the thiamine pyrophosphate eluted with good retention (k of about 31) and a sharp elution peak with an elution time of about 8 minutes.

The retention time was shortened to about 30 seconds with a sharp peak by changing the mobile phase conditions to a mobile phase A of 10 mM ammonium formate and 0.5% (v/v) formic acid in water and a mobile phase B of 10 mM ammonium formate and 0.5% (v/v) formic acid in 90/10 (v/v) acetonitrile/water with and using a flow rate of 0.6 mL/min.

Example 15

A mixture of the organic acids quinic acid, malic acid, fumaric acid, citric acid, and tartaric acid was applied to a column containing silica bonded with the hybrid ligand of Formula (4). The column operated as a weak anion exchange column, with a first mobile phase (A) including 10 mM ammonium formate and 0.5% (v/v) formic acid in water and a second mobile phase (B) including 10 mM ammonium formate and 0.5% (v/v) formic acid in 90/10 (v/v) acetonitrile/water with a flow rate of 0.5 mL/min.

The gradient mobile phase started with 65% A/35% B to one minute, then transitioned to 100% A by 2 minutes, and then remained at 100% A to the end of the elution. The organic acid analytes were detected by mass spectrometry via selective ion monitoring in the negative mode. More specifically, the monitoring m/z of the organic acids was 191 for quinic acid, 133 for malic acid, 115 for fumaric acid, 191 for citric acid, and 149 for tartaric acid.

Figure 10:
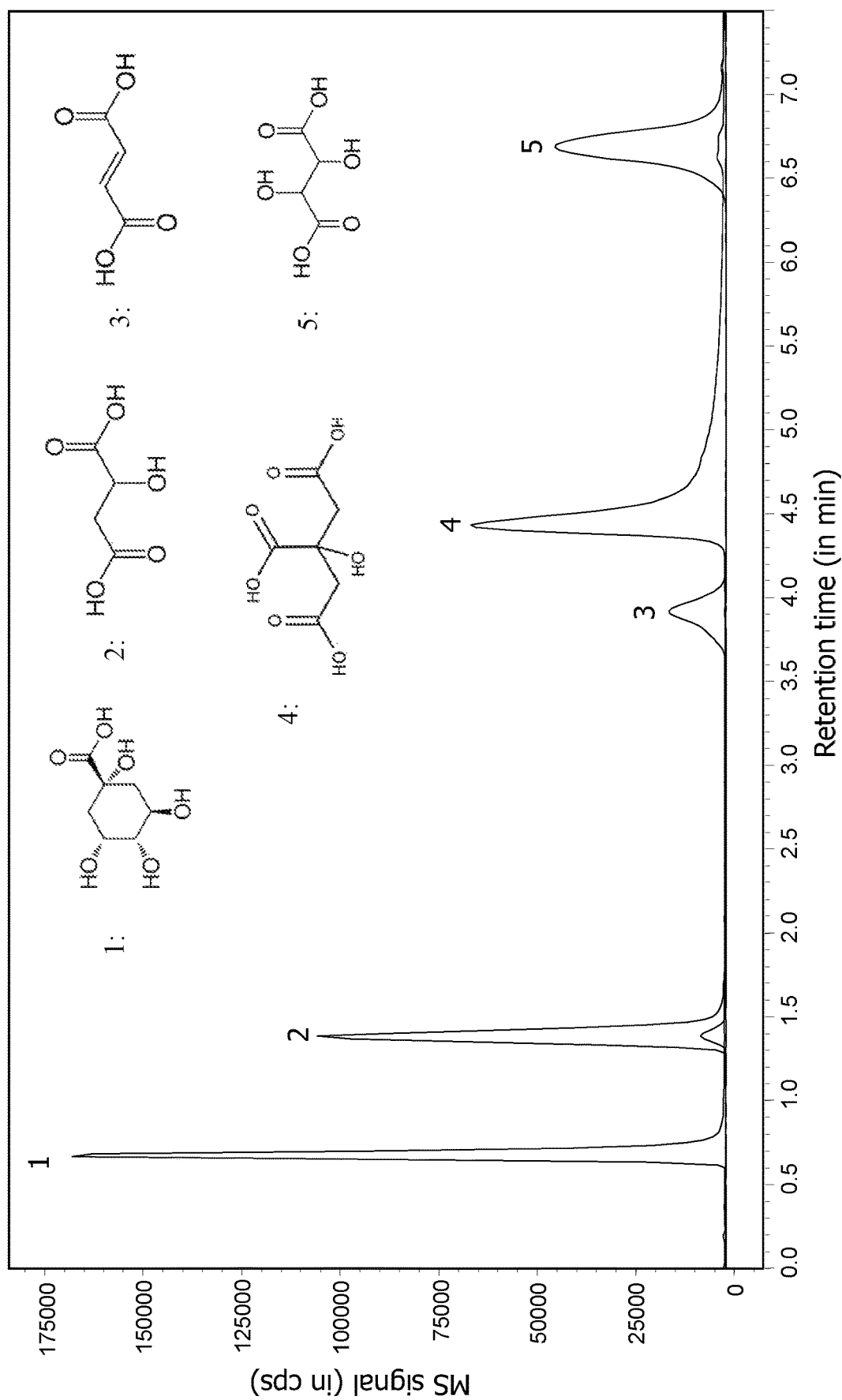
FIG. 10 shows LC/MS separation results for organic acids with an immobilized hybrid ligand of the present disclosure.

As shown by the chromatogram of FIG. 10, good separation of the tested organic acids was observed. The quinic acid (1) eluted first with a retention time of about 0.7 minutes, the malic acid (2) eluted second with a retention time of about 1.4 minutes, the fumaric acid (3) eluted third with a retention time of about 3.9 minutes, the citric acid (4) eluted fourth with a retention time of about 4.4 minutes, and the tartaric acid (5) eluted fifth with a retention time of about 6.7 minutes. Noteworthy was the separation of the isobaric analytes quinic acid and citric acid, and the separation of quinic acid from tartaric acid, which can be difficult to achieve on a reversed-phase column like C18.

All above-mentioned references are hereby incorporated by reference herein.

While the invention has been described with reference to one or more embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

21. The device of claim 16, wherein the solid support is a silica solid support, the immobilized hybrid ligand being of the formula:
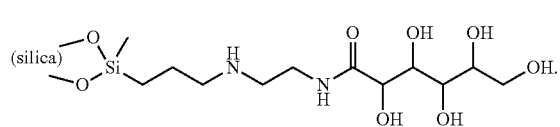

What is claimed is:

1. A composition comprising an immobilized hybrid ligand coupled to a solid support, wherein the immobilized hybrid ligand includes an amine group, an amide group or a sulfonamide group, and a plurality of hydroxyl groups, wherein the immobilized hybrid ligand contains no other functional groups besides the amine group, the amide group or the sulfonamide group, the plurality of hydroxyl groups, and a functional group coupling the immobilized hybrid ligand to the solid support,
   wherein the solid support is spherical silica having a diameter in the range of 10 nm to 100 μm and a pore size in the range of 10 Å to 1000 Å, or
   wherein the solid support is a polymeric material selected from the group consisting of polymeric particles, polymeric monolith, and a three-dimensionally printed polymeric structure.

2. The composition of claim 1, wherein the solid support is a silica solid support, the immobilized hybrid ligand being of the formula:

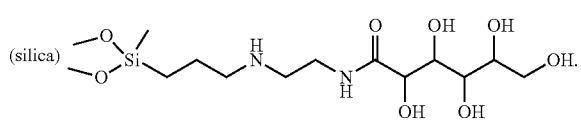 [SMILES: CO[Si](C)(CCCNCCNC(=O)C(O)C(O)C(O)C(O)CO)OC]

3. A method of separating polar analytes, the method comprising:
   providing a solution containing a first polar analyte and a second polar analyte;

applying the solution to a stationary phase comprising an immobilized hybrid ligand, wherein the immobilized hybrid ligand includes an amine group, an amide group or a sulfonamide group, and a plurality of hydroxyl groups, and wherein the hybrid ligand contains no other functional groups besides the amine group, the amide group or the sulfonamide group, the plurality of hydroxyl groups, and a functional group coupling the hybrid ligand to a solid support;

applying an elution solvent to the stationary phase such that the first polar analyte and the second polar analyte pass through the stationary phase with different elution times; and collecting the first polar analyte leaving the stationary phase at a first elution time and collecting the second polar analyte leaving the stationary phase at a second elution time after the first elution time.

4. The method of claim 3, wherein the solid support is a material selected from the group consisting of silica, hybrid inorganic/organic silica, and silica monolith.

5. The method of claim 3, wherein the solid support is a material selected from the group consisting of silica particles, hybrid inorganic/organic silica particles, silica monolith, and hybrid inorganic/organic silica monolith.

6. The method of claim 3, wherein the solid support is spherical silica having a diameter in the range of 10 nm to 100 μm and a pore size in the range of 10 Å to 1000 Å.

7. The method of claim 3, wherein the solid support is a polymeric material selected from the group consisting of polymeric particles, polymeric monolith, and a three-dimensionally printed polymeric structure, and wherein the immobilized hybrid ligand is coupled to the polymeric material.

8. The method of claim 7, wherein the polymeric particles are selected from the group consisting of polystyrene divinylbenzene, poly(vinyl alcohol), and polymethyl methacrylate.

9. The method of claim 3, wherein the immobilized hybrid ligand is of the formula:

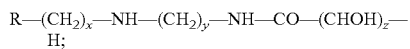

wherein R represents a functional group attached to the solid support and x, y, and z independently are integers in the range of 2 to 10.

10. The method of claim 9, wherein x and y independently are integers in the range of 2 to 3.

11. The method of claim 3, wherein the first polar analyte and the second polar analyte are each independently selected from the group consisting of acidic herbicides, organic acids, amino acids, water-soluble vitamins, sugars, nucleosides, nucleotides, drug metabolites, and peptides.

12. The method of claim 3, wherein the amine group is selected from the group consisting of a secondary amine, a tertiary amine, and a quaternary amine.

13. A method of separating polar analytes, the method comprising:

providing a solution containing a first polar analyte and a second polar analyte;

applying the solution to a stationary phase comprising a silica solid support and an immobilized hybrid ligand immobilized to the silica solid support, the immobilized hybrid ligand being of the formula:

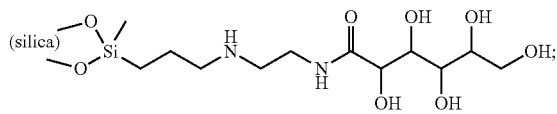 [SMILES: CO[Si](C)(CCCNCCNC(=O)C(O)C(O)C(O)C(O)CO)OC]

applying an elution solvent to the stationary phase such that the first polar analyte and the second polar analyte pass through the stationary phase with different elution times; and collecting the first polar analyte leaving the stationary phase at a first elution time and collecting the second polar analyte leaving the stationary phase at a second elution time after the first elution time.

14. The method of claim 13, wherein the solid support is spherical silica having a diameter in the range of 10 nm to 100 μm and a pore size in the range of 10 Å to 1000 Å.

15. The method of claim 13, wherein the first polar analyte and the second polar analyte are each independently selected from the group consisting of acidic herbicides, organic acids, amino acids, water-soluble vitamins, sugars, nucleosides, nucleotides, drug metabolites, and peptides.

16. A device comprising:

a chromatographic material comprising a solid support and an immobilized hybrid ligand coupled to the solid support as the stationary phase, the immobilized hybrid ligand comprising an amine group, an amide group or a sulfonamide group, and a plurality of hydroxyl groups, wherein the immobilized hybrid ligand contains no other functional groups besides the amine group, the amide group or the sulfonamide group, the plurality of hydroxyl groups, and a functional group coupling the immobilized hybrid ligand to the solid support;

wherein the device is selected from the group consisting of a packed column, a cartridge, a tube, a well plate, a membrane, and a planar thin-layer chromatography plate.

17. The device of claim 16, wherein the solid support is a material selected from the group consisting of silica particles, hybrid inorganic/organic silica particles, silica monolith, and hybrid inorganic/organic silica monolith.

18. The device of claim 16, wherein the solid support is spherical silica having a diameter in the range of 10 nm to 100 μm and a pore size in the range of 10 Å to 1000 Å.

19. The device of claim 16, wherein the solid support is a polymeric material selected from the group consisting of polymeric particles, polymeric monolith, and a three-dimensionally printed polymeric structure, and wherein the immobilized hybrid ligand is coupled to the polymeric material.

20. The device of claim 19, wherein the polymeric particles are selected from the group consisting of polystyrene divinylbenzene, poly(vinyl alcohol), and polymethyl methacrylate.